United States Patent [19]
Vogelsberg

[11] 4,266,398
[45] May 12, 1981

[54] METHOD AND APPARATUS FOR THE LAYERWISE SZ TWISTING OF ELEMENTS OF ELECTRICAL OR OPTICAL CABLES

[75] Inventor: Dieter Vogelsberg, Coburg, Fed. Rep. of Germany

[73] Assignee: Siemens Aktiengesellschaft, Berlin and Munich, Fed. Rep. of Germany

[21] Appl. No.: 49,288

[22] Filed: Jun. 18, 1979

[30] Foreign Application Priority Data

Jun. 28, 1978 [DE] Fed. Rep. of Germany ....... 2828959

[51] Int. Cl.³ .................... H01B 13/04; D07B 3/00
[52] U.S. Cl. ........................................ 57/293; 57/6
[58] Field of Search ................ 57/6, 9, 293, 294, 314

[56] References Cited

U.S. PATENT DOCUMENTS

| | | | |
|---|---|---|---|
| 3,491,525 | 1/1970 | Sugi | 57/294 |
| 3,593,509 | 7/1971 | Feese et al. | 57/293 |
| 3,847,190 | 11/1974 | Forester | 57/293 X |
| 3,884,025 | 5/1975 | Oberender et al. | 57/293 |
| 4,127,982 | 12/1978 | Braun et al. | 57/293 X |

FOREIGN PATENT DOCUMENTS 1095434 12/1967 United Kingdom .

*Primary Examiner*—John Petrakes
*Attorney, Agent, or Firm*—Kenyon & Kenyon

[57] ABSTRACT

A method and apparatus for the layer-wise SZ twisting of electrical or optical cables in which, so that, in the manufacture of multi-layer cables, several stranded layers can be applied in one operation, the twisting elements are fed at points within a single stretched accumulator offset in the longitudinal direction and the speeds of rotation of the twisting heads are varied periodically in at least two increasing and decreasing steps with the distances of the twisting heads from each other adjusted, so that adjacent stranded layers have reversal points of the twist direction which are offset relative to each other.

For applying a stranded layer, a twisting closer immediately followed by a rotating twisting head is provided at each feeding point.

7 Claims, 10 Drawing Figures

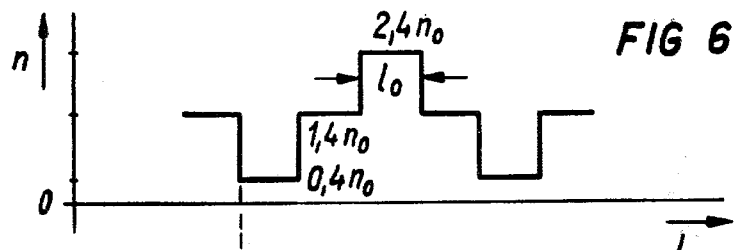
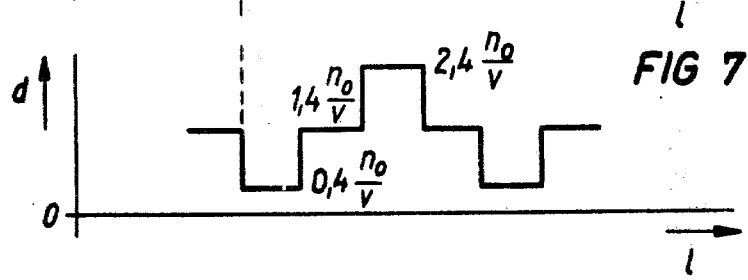
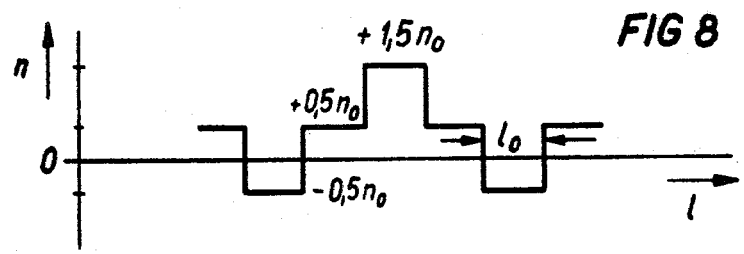
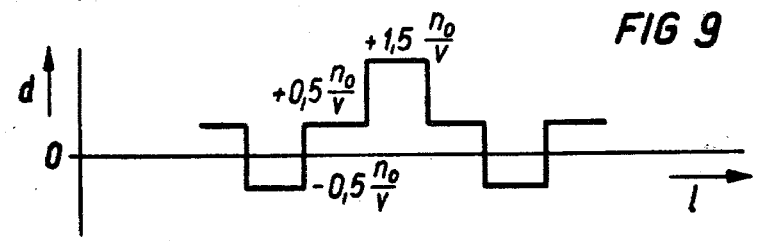
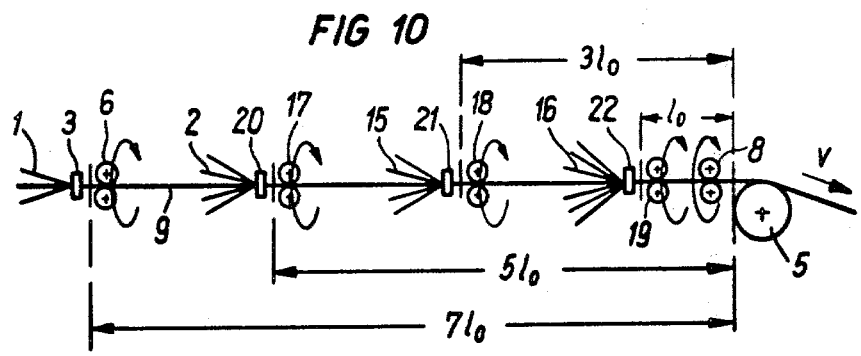

METHOD AND APPARATUS FOR THE LAYERWISE SZ TWISTING OF ELEMENTS OF ELECTRICAL OR OPTICAL CABLES

BACKGROUND OF THE INVENTION

This invention relates to the twisting of electrical and optical cables and lines and more particularly to the layerwise twisting of corresponding twisting elements with special consideration of the SZ twisting technique.

The development in the field of SZ twisting technology for electric cables and lines which started at the beginning of the sixties has led to SZ twisting methods and SZ twisting machines, with which two to five twisting elements, for instance, conductors for sheathed cables, conductors for pairs, triplets or spiral quads of communication cables, can be twisted together without problem. It is characteristic for the majority of the SZ twisting methods developed, namely those which work with a concentrated or not concentrated accumulator, that the final twisting of the material to be twisted is the result of a superposition of at least two twisting operations of opposite direction, which take place at the entrance and the exit of the SZ twisting device. This applies, for instance, to the twisting with a rotating length accumulator of alternating direction of rotation, to the twisting with a revolving twisting device and changing accumulator content, to the twisting by means of a twisting head arranged at the end of a torsioning section (U.S. Pat. No. 3,593,509) as well as to the twisting with two twisting heads which are arranged at the beginning and the end of a torsioning section and revolve with constant direction of rotation.

The SZ twisting machines nowadays available on the market operate, as a rule, with the material to be twisted stretched taut during the twisting, the material to be twisted being tensionally gripped from the outside in the circumferential direction by means of rotating twisting heads. In the region of the twisting section proper, the material to be twisted is conducted through open air or by means of special guide elements. The rotary motion of the twisting heads changes at distances which are matched to the time interval between the first twisting when entering the twisting section and the second twisting of this length when leaving the twisting section. It is customary to change the rotary motion in steps between two values. The period of these stepwise changes is as a rule twice the mentioned time interval, but can also be an uneven part thereof (German Auslegschrift DE-AS 15 15 730, claim 1).

Since the beginnings of SZ twisting, methods and apparatus have also been considered by which twisting elements can be SZ twisted in layers. Here, a twisting plate revolving with alternating direction of rotation is essentially provided as the twisting means proper (German Pat. No. 631 929, claim 1). It is, however, a particular difficulty in the development of suitable methods and machine designs for this kind of layerwise twisting, that the twisting should lead to spacings of the reversal points of the twist direction as large as possible in the twisted material produced.

For multi-layer twisting of twisting elements of electric cables in one operation, twisting machines are otherwise known which operate conventionally, i.e., with constant rotary motion and constant pull-off velocity and in which the stationary twisting elements are fed to several staggered twisting closers. The twisting is accomplished by a constant rotary motion of the take-up device and of other torsioning devices associated with each twisting closer, and a variation of the length of lay between adjacent twisted layers is achieved by moving one or more twisting closers (German Auslegeschrift DE-AS 14 90 355, claim 1). It is also known to effect the length of the lay variation by means of revolving intermediate accumulators which change their rotary motion at intervals (German Offenlegungschrift DE-OS 18 01 063, claim 1).

SUMMARY OF THE INVENTION

It is an object of the present invention to provide a method for SZ twisting twisting elements of electrical and optical cables and lines, in which the twisting elements can be stranded, in the same operation, in several stranded layers. In addition, apparatus suitable for implementing this method is to be described.

To solve the stated problem, the invention starts out from a method for the continuous SZ twisting of twisting elements of electrical or optical cables and lines to form a stranded group, in which the twisting elements are twisted together a first time in three steps following each other in the same operation; are conducted subsequently, in the twisted, taut condition, temporarily through open air or by means of special guide elements and are thereupon twisted together a second time; in which furthermore one or more of the process parameters causing the twisting are periodically changed in steps at intervals (step duration) which are an uneven part ($\frac{7}{8}$, 1/5, 1/7 . . . ) of the time interval between the first and the second twising of a longitudinal section of the twisting elements of the twisting group; and in which, finally, the superposition of the first and the second twising leads to a resultant twist with a twist direction which changes from section to section. According to the present invention, the following three measures are provided in the new embodiment of this twisting method:

1. For multi-layer SZ twisting of twisting elements, the twisting elements of each stranded layer to be placed on the twisted group is palced thereon after the first but still before the second twisting of the twisting elements of the stranded group and are twisted in the process a first time, and are later twisted a second time together with the twisting elements of the stranded group.

2. One or more of the process parameters causing the twist are changed in m even, at least four, steps which follow each other, increasing and decreasing uniformly and periodically (period L).

3. The spacings in time between the first and the second twisting of a longitudinal section of the twisting elements of the stranded group or a twisting layer are different from stranded group to twisting layer or from twisting layer to twisting layer and are larger or smaller by one step duration than an arbitrary multiple of p (p=1, 2, 3 . . . ) of the period (L).

Such an SZ twisting method thus has the advantage that simultaneously with the twisting of twisting elements into a stranded group, further twisting elements can be stranded onto the stranded group in one or more stranded layers. By staggering the first twisting of the twisting elements of the stranded layers in time relative to the first twisting of the twisting elements of the stranded group, the reversal points of the twist direction in adjacent stranded layers are offset in the longitudinal direction relative to each other, so that the reversal points of the twist direction of one stranded layer are covered over by a neatly twisted S or Z section of the next stranded layer. Otherwise, with correct design of the twisting parameters, each individual stranded layer is subject only to two twisting or retwisting processes, as is the case with most of the other known SZ twisting methods. The inner core of the material to be stranded, formed by the stranded group, is therefore not retwisted any more often than the outer stranded layer.

It is a characteristic, among other things, of the new SZ twisting method that one or more of the process parameters effecting the twisting, particularly the rotary motion of corresponding twisting heads, are continuously increased and decreased within a twisting period in several steps of equal length in accordance with a symmetrical staircase curve. The number of steps must be at least 4, but can also be any other integral multiple of two.

A further characteristic feature of the new SZ twisting method is seen in the fact that the twisting process of the individual stranded layers, consisting of the first and the second twisting, last different times, whereby the offsetting of the twist reversal points of the twist direction in adjacent stranded layers is obtained, in spite of the fact the period of the symmetrical staircase curve is the same for all stranded layers.

Apparatus suitable for carrying out the new SZ twisting method, like other known SZ twisting devices, includes: stationary supplies for the twisting elements; an SZ twisting device having a first and a second twisting point (twisting closer, reversing pulley); a rotable twisting head which is associated with the second twisting point or with the first and the second twisting points and which grips the material to be twisted tensionally from the outside; and a pull-off and a take-up device. In accordance with the present invention, for applying a stranded layer onto the stranded group, a further twisting closer with an immediately following rotable twisting head, for each stranded layer is arranged, between the first and the second twisting point.

In such SZ twisting apparatus there are thus arranged between the two twisting points which are formed, for instance, by twisting closers or deflection pulleys, further twisting closers, by which the stretched accumulator, which is limited by the two twisting points, is subdivided so that the twisting elements fed into the individual twisting closers traverse sections of different lengths within the stretched accumulator. For twisting a stranded group and the subsequent stranding of several twisting layers, only a single stretched accumulator is therefore required overall. A particularly simple embodiment of the new apparatus is obtained if the distance between two successive first twisting points is always twice the length by which a length element of the material to be twisted is advanced during one twisting step of the symmetrical staircase curve, and if the distance between the last first twisting closer, i.e., the twisting closer of the last stranded layer to be applied, and the second twisting point is equal to the simple length by which a length element of the material to be twisted is advanced during a twisting stage of the symmetrical staircase curve.

BRIEF DESCRIPTIONS OF THE DRAWINGS

FIG. 3-9 are diagrams illustrating different staircase functions which may be used in twisting according to the present invention.

FIG. 10 is a schematic diagram of a further embodiment of twisting apparatus according to the present invention.

DETAILED DESCRIPTION OF THE INVENTION

Figure 1:
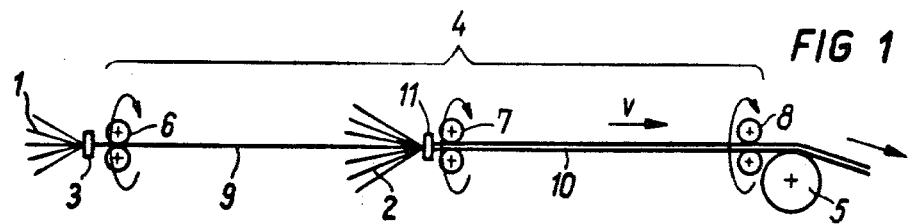
FIG. 1 is a schematic drawing of twisting apparatus according to the present invention.

FIG. 1 shows SZ twisting apparatus which is constructed from known design elements. The twisting machine strands several elements 1 to be twisted ("twisting elements") to form a stranded group 9 and simultaneous strands several twisting elements 2 to form a stranded layer 10. The twisting elements 1 are twisted by means of a known SZ twisting device which is confined between a twisting closer 3 and a deflection pulley 5 and contains two rotable twisting heads 6 and 8 which are associated, respectively, with the twisting closer 3 and the deflection pulley 5 which forms a twisting point. For SZ twisting, the material to be twisted is transported through the SZ twisting device at constant velocity v, while the twisting heads 6 and 8, rotating with the speed of rotation n, change their rotary motion synchronously at definite intervals. The twisting heads 6 and 8 consist, in a manner known per se, either of a deflection pulley over which the material to be twisted is looped once, or of two or more pulleys which are disposed opposite each other and between which the material to be twisted runs through, or of two caterpillar tracks pressed together.

In the twisting operation, the elements 1 to be twisted run off from stationary supplies, not specifically shown here, and are pulled off and wound up by a pull-off and take-up device, likewise not specifically shown.

For stranding a stranded layer onto the stranded group 9, a twisting closer 11 as well as a rotable twisting head 7, provided immediately thereafter, are arranged within the stretched accumulator 4 defined by the twisting closer 3 and the deflection pulley 5. This twisting head 7 rotates synchronously with the twisting heads 6 and 8. During the twisting, the twist elements 2 run through the tensioned accumulator 4 only in the zone between the twisting closer 11 and the deflection pulley 5, while the twisting elements 1 traverse the entire stretched accumulator.

Figure 2:
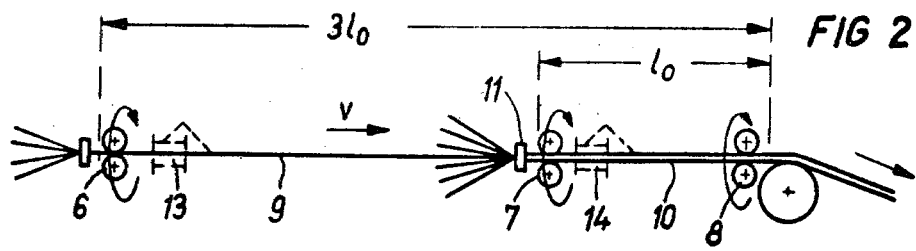
FIG. 2 is a similar view illustrating length relationships.

In the operation of the twisting machine shown, the rotary motions of the twisting heads 6, 7 and 8 and the distance of the twisting closer 11 from the twisting points 3 and 5 must be matched to each other. An example therefore is shown in FIG. 2 where the distance between the twisting closer 11 and the deflection pulley 5 is a certain length $l_o$ and the distance between the twisting closer 3 and the deflection pulley 5 is three times this length, i.e., $3l_o$. In the operation of the twisting machine, the speeds n of the twisting heads 6, 7 and 8 are changed in accordance with the speed diagram shown in FIG. 3, i.e., the speed of rotation is increased and decreased continuously according to a symmetrical staircase curved in four steps of equal length per repetition period, the constant step height being designated with $n_o$ and the step length $t_o$ corresponding to the quotient of the distance $l_o$ of the twisting points 11 and 5 and the pull-off velocity v. The running length of the twisting elements is designated as l.

The twisting closer 11 subdivides the stretched accumulator in such a way that the stranded group 9 and the twisting elements of the outer stranding layer 10 run through the stretched accumulator in sections of different lengths, which are always larger or smaller by one step length $l_o$ than an arbitrary p multiple of the period $T = m \times l_o$ (with p=0, 1, 2, 3, ..., and m=the number of steps of equal length within the repition period). In the simplest case, which is shown in FIG. 2, the stretched accumulator can be subdivided into two sections of the lengths $l_o$ and $31_o$ within each other. During the twisting process, the accumulator section $31_o$ is accordingly effective for the stranded group 9, while for the stranding layer 10 only an accumulator section of length $l_o$ is effective.

Figure 4:
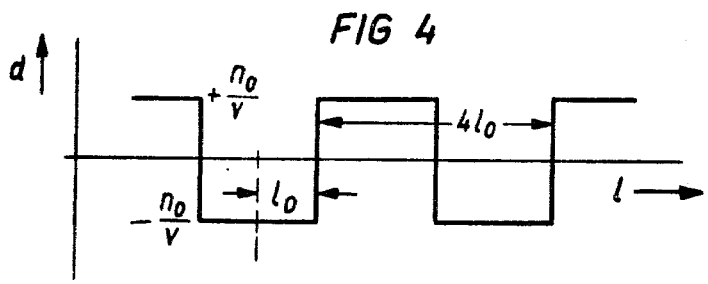
Figure 5:
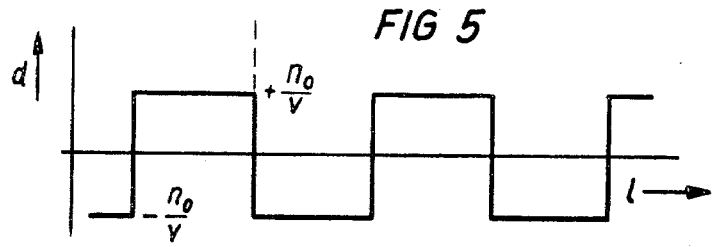

From the twists imparted to the twisting elements 1 and 2 when entering and leaving the accumulator section, taking into consideration the different running times of the twisting elements in the accumulator, resulting overall twists d, as are shown in FIGS. 4 and 5 for the twisting group 9 and the stranded layer 10, are obtained. In the stranded group 9 as well as in the stranded layer 10, the direction of twist changes at intervals $21_o$, a phase offset of length $l_o$ existing between the stranded group 9 and the stranding layer 10. The twist direction of the stranded group 9 thus always changes in the middle between two reversal points of the twist direction of the stranding layer 10.

Figure 3:
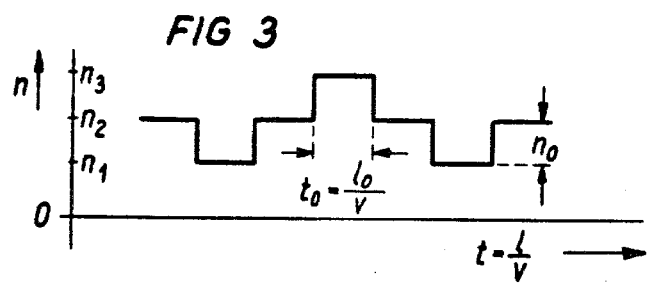

Since the symmetrical staircase function shown in FIG. 3 is repeated with the period $41_o$, the same result is obtained if the pairings $31_o/51_o$ or $51_o/71_o$ etc. are chosen instead of the pairing $1_o/31_o$ for the stretched accumulator.

In carrying out the new SZ method, the velocity of the material to be twisted running through, the relative spacings of the twisting points and the twisting heads from each other, or the rotary motions of the twisting heads can be varied in any selection or combination. The simplest embodiments are obtained if the rotary motions of the twisting heads are changed and the process parameters are otherwise held constant. If the rotary motion of the twisting heads is changed, certain limits are found to exist for the absolute speed level, which are given by the permissible mechanical stressing of the twisting elements due to the twist. Thus, the twist $d = n/v$ of the twisting elements inside the accumulator section should not be much larger or smaller than the final resulting twist of the twisting elements. This requirement also limits the number of steps within the symmetrical staircase curve.

It appears permissible, for instance, to allow, in the stretched accumulator, a twist of the twisting elements which is smaller or larger by a factor 2.5 than the final resultant twist. In that case it is advantageous to choose the speed curve according to FIG. 6, where three speed steps with the values $0.4 n_o$, $1.4 n_o$ and $2.4 n_o$ are chosen. Such a speed cycle has the advantage that the twist, as shown in FIG. 7, changes its sign within the stretched accumulator neither for the twisted group 9 nor the standard layer 10. Reversal points of the twist direction are produced only at the end of the accumulator section, so that special measures for fixing the reversal points within the accumulator are unnecessary.

Under practical use conditions, a design is sometimes necessary, in which the twist $d = n/v$ must be only between 0.5 times and 1.5 times the final twist $n_o/v$. In that case, a speed cycle as per the diagram shown in FIG. 8 is advisable, according to which the direction of rotation of the twisting heads is changed at certain intervals. The corresponding curve of the twist within the accumulator section is shown in FIG. 9. Accordingly, the twist direction within the accumulator section changes periodically for the core as well as for the stranded layer. So that the stranded assembly assembly within the accumulator section cannot fall apart, the reversal points of the twist direction must be held together there. This can be accomplished, for instance, by means of holding coils which are applied by means of central spinners 13 and 14 shown in FIG. 2. Instead of such spinners, rotating caterpillar tracks can also be used.

The twisting heads 6, 7 and 8 provided within the SZ twisting machine must be matched to each other as far as their speed of rotation is concerned. If these speeds are chosen equal among themselves, then the lengths of lay of the stranded group and the stranded layer are equal to each other and constant. In many cases, however, it is not desirable for the stranded group and the stranded layers applied thereon to have exactly the same length of lay, especially if the direction of lay is the same. In order to obtain different lengths of lay, the twisting heads 6, 7 and 8 are made to rotate at different speeds. These can be staggered, for instance, increasing toward the second twisting point. In any event, however, the change of speed of the twisting heads must be synchronous.

If twisting elements of large cross section are twisted, the rotation of the strand moved by the twisting head 7 is continued, because of the stiffness of the twisting elements, up to the first twisting closer 3 without the need for a twisting head 6 behind this twisting closer. In such a case, the twisting head 6 can also be omitted.

A final embodiment, shown in FIG. 10, deals with the simultaneous SZ twisting of several stranded layers about a stranded group. In this example it is assumed that a first SZ stranded layer 23, a second SZ stranded layer 24 and a third SZ stranded layer 25 are applied over an SZ stranded group 9. The speeds of the twisting heads 6, 17, 18 and 19, of which the last three are arranged immediately behind the twisting closers 20 for the twisting elements 2 of the first stranding layer, behind the twisting closer 21 for the twisting elements 15 of the second stranded layer and behind the twisting closer 22 for the twisting elements 16 of the third stranded layer, are varied in accordance with the speed function shown in FIG. 8. The total length of the stretched accumulator is $71_o$ and within the accumulator section, the subsections $1_o$, $31_o$ and $51_o$ are provided for the different stranding layers. According to the explanations above, resultant twists according to FIG. 4 are obtained for the stranded group 9 and for the second stranded layer 24. The stranded layers 23 and 25, on the other hand, are given twists as per FIG. 5. The length of lay is the same in all layers and is $s = v/n_o$.

With this multi-layer SZ twisting, each twist reversal point of one stranded layer is covered over by a uniformly stranded S or Z section of the layer above it. In the finished twisted material, the spacing of the reversal points of the twist direction is $21_o$.

Also in the embodiment shown in FIG. 10, the lay lengths obtained in the stranded layers can be modulated if the speeds of rotation of the twisting heads are not chosen equal. In any case, however, the speed changes of all twisting heads must take place together.

As already mentioned, the SZ twisting machines shown are suitable for the layer-wise twisting of twisting elements. Corresponding cable construction are obtained, particularly for control cables with, for instance, 1+6+12 conductors or for layer-stranded symmetrical communication cables with a small number of conductors, or also for the manufacture of calbe rope for electric cables and lines. In stranding wire, it may be advisable to arrange a densification or forming tool which rotates with the twisting head about the twisting axis behind the respective twisting head, or to design the twisting head itself as a densification or forming tool.

In the practical implementation, one can operate, for instance, with a pulling-off velocity of $v=50$ m/min, a step height $n_o=500$ RPM and a step length $l_o=2$ m.

I claim:

1. In a method for the continuous SZ twisting of twisting elements of electrical or optical cables and lines to form a stranded group, in which the twisting elements are twisted together a first time in three steps following each other in the same operation; are conducted subsequently as a stranded group in a twisted, taut condition temporarily through open air or by means of special guide elements and are thereupon twisted together a second time; in which furthermore, one or more of the process parameters causing the twisting are periodically changed in steps at intervals which are an uneven part of the time interval between the first and the second twisting of a longitudinal section of the twisting elements of the stranded group; and the superposition of the first and the second twisting leads to a resultant twist with a twist direction which changes from section to section, a method for also obtaining multi-layer twisting of twisting elements to form standed layers on the stranded group comprising: placing the twisting elements of each stranded layer to be placed on the stranded group thereon after the first, but still before the second, twisting of the twisting elements of the stranded group; twisting the twisting elements of said stranded layer a first time; later twisting said twisting elements of said stranded layer a second time together with the twisting elements of the stranded group; changing one or more of the process parameters causing the twist in m even, at least four, successive steps increasing and decreasing uniformly and periodically; and selecting the spacings in time between the first and second twisting of a longitudinal section of the twisting elements of the stranded group or a stranded layer to be different from stranded group to twisting layer or from twisting layer to twisting layer by an amount that is larger or smaller by one step duration than an arbitrary multiple of the period.

2. In apparatus for the multi-layer SZ twisting of twisting elements of electrical or optical cables and lines including stationary supplies for twisting elements; an SZ twisting device with a first and a second twisting point; at least one rotating twisting head associated with the second twisting point, said twisting head gripping the material to be stranded tensionally from the outside; and a pulling-off and windup device, the improvement comprising: a further twisting closer for placing a stranded layer on a stranded group which is formed between the first and second twisting points and a rotating twisting head immediately following said twisting closer, a twisting closer and twisting head being provided for each stranded layer to be placed on the stranded group, said twisting closer and twisting head, disposed between the first and second twisting points.

3. The improvement according to claim 2, including means to drive all twisting heads so that they revolve with the same speed of rotation and direction of rotation.

4. The improvement according to claim 2, including means to drive the twisting heads so that they revolve with the same direction of rotation but with speeds of revolution which deviate from each other and wherein said twisting heads are staggered in the direction toward the second twisting point.

5. The improvement according to claim 2, wherein said apparatus includes means to vary the direction of rotation of twisting heads at intervals, and further including, between successive twisting closers, a means for preventing unraveling the material to be twisted at reversal points.

6. The improvement according to one of the claims 2 to 5 for the SZ twisting of wires to form a cable rope of an electric cable, and further including densification means disposed at at least one of the twisting closers.

7. The improvement according to one of the claims 2 to 5 wherein the distance between two successive first twisting points is always twice the length by which a longitudinal element of the material to be twisted is advanced during one twisting step, and wherein the distance between the last first twisting point and the second, common twisting point is equal to the simple length, by which a longitudinal element of the material to be twisted is advanced during one twisting step.

* * * * *